Patented Oct. 2, 1934

1,975,598

UNITED STATES PATENT OFFICE 1,975,598

PURIFICATION OF TRINITROTOLUENE

George Parker Davies, Stevenston, Scotland, assignor to Imperial Chemical Industries Limited, a corporation of Great Britain No Drawing. Application July 8, 1932, Serial No. 621,515. In Great Britain July 27, 1931

11 Claims. (Cl. 260—142)

This invention relates to improvements in the sulphite method for the purification of trinitrotoluene.

The main impurities occurring in crude trinitrotoluene, i. e. the material as it leaves the nitrator but separated from the refuse acid, are the isomeric trinitrotoluene bodies resulting from the trinitration of the meta nitrotoluol formed in the mononitration of the toluol. These bodies, hereafter called the beta and gamma isomers as distinct from the alpha TNT which is the essential product of the manufacture, occur in the crude TNT to the extent of about 4%, and it is the removal of these isomers that is the main function of the purification treatment necessary to make the TNT suitable for sale as high quality material for use in explosives, etc.

It is well known that sodium sulphite in its aqueous solution reacts with these beta and gamma isomers to form salts of nitrosulphonic acids of well-defined composition. These salts, being soluble in water, are removed in the aqueous solution, and this reaction forms the basis of the widely used sulphite process for purifying TNT. This process suffers from the disadvantage that sodium sulphite solutions attack the alpha TNT as well as the beta and gamma TNT, though more slowly, which results in the loss of some of the TNT and the discolouration of the remainder. In practice therefore it is necessary, in order to avoid spoiling the final material to carry out the reaction under a strictly limited range of conditions, and this increases the difficulty and expense of the operation very considerably. In particular it has hitherto been considered desirable to carry out the sulphite reaction on TNT in the solid form. TNT is molten only above 80° C., and at this temperature some decomposition of the TNT under ordinary conditions results.

Before the purification treatment the crude TNT is in the form of a molten liquid, so that it requires to be submitted to a solidification process before the application of the sulphiting treatment. Further, it has been considered desirable for the TNT to be treated to be in the form of crystals with a particular structure, namely with the impurities forming an external coating protecting the inner core of pure alpha TNT from the action of the sulphite. To obtain TNT in this form, the solidification process has to be of a special character. After the purification treatment these crystals have to be remelted in order to undergo the usual drying, filtering and flaking operations. It will be realized that in practice this initial operation of solidifying the TNT and, to a certain extent, the subsequent one of remelting it form the most troublesome and expensive part of the sulphite purification process.

This disadvantage would not exist in any process in which the sulphiting reaction was carried out on the original molten crude TNT, but the development of such a process has hitherto been considered to be quite out of the question for the reasons given above. As far as I know no such process involving sulphiting molten TNT has ever been proposed. In view of the undoubted advantages which the development of such a process would possess I have investigated the whole problem afresh, and as the result of such investigations have discovered means whereby the removal of the impurities referred to from molten TNT may be satisfactorily accomplished. For this purpose I treat the crude TNT while still in the molten condition with certain aqueous solutions containing sodium sulphite characterized as will appear hereinafter.

When molten TNT is treated with a solution containing only sodium sulphite, which solution is used in the ordinary sulphite process, the attack on the alpha TNT, as well as on the beta and gamma TNT, is quite appreciable, and is intensified by the development of alkalinity in the solution as the reaction proceeds, so that after the reaction has proceeded for a short time the alpha TNT acquires a dark brown color which makes it unsuitable for sale as high quality material.

The presence of acid bodies on the other hand has been found to retard the action of the sulphite solution and I have further found that the effect depends on the amount and nature of the acid employed. Thus, with strong acid such as sulphuric acid or sulphurous acid if only enough be added to neutralize any original alkalinity in the sulphite the ultimate effect is negligible, since the system becomes alkaline again during the course of the reaction. With larger amounts of such acids the retarding effect is greater not only for the attack on the alpha TNT but also on the beta and gamma TNT, and if enough acid be added to prevent the discoloration of the final material the removal of the isomers is almost prevented.

I have discovered that the correct principle to be employed for controlling the reaction to permit of the removal of the beta and gamma isomers while preventing any appreciable attack on the alpha TNT, is to use along with the aqueous sodium sulphite a comparatively large amount of a substance or mixture of substances having only very weakly acidic properties. The use of such a substance or substances in suitable proportions has the desired effect of maintaining the pH of the aqueous solution more or less constant throughout the reaction at a figure low enough to prevent the attack of the sulphite solution on the alpha TNT but not low enough to reduce to any appreciable extent the reaction of the sulphite with the beta and gamma isomers. More particularly I have found that the weakly acid substance or mixture should be present in the sulphite solution in sufficient amount to produce an initial sulphite solution of hydrogen ion concentration within the limits pH 7.0 and 8.3 as measured by the normal indicator colorimetric method.

Examples of the materials I have found to be beneficial in this way are:—
 (1) A mixture of sodium acetate and acetic acid.
 (2) A mixture of sodium mono-hydrogen phosphate and sodium di-hydrogen phosphate.
 (3) Boric acid alone or, when the crude TNT contains a little residual acid to start with, boric acid mixed with a little sodium borate.
 (4) Ammonium bicarbonate and sodium bicarbonate are to some extent useful for this purpose, but care must be taken in the case of these particular substances not to leave the purified TNT in contact with the solution for any appreciable length of time owing to the fact that they are unstable at the temperature of reaction, forming the normal carbonates, which are alkaline and tend to discolor the TNT.

The invention consists essentially in the purification of TNT by treating it in the molten state, at a temperature at or slightly above the solidification temperature in the presence of water, with an aqueous solution of an alkali sulphite in presence of a weakly acidic substance or mixture of substances in quantity at least sufficient to maintain an approximately constant hydrogen ion concentration throughout the purification, the initial hydrogen ion concentration of the buffered sulphite solution lying between the limits pH 7.0 and 8.3 as measured by the normal indicator colorimetric method.

The new process can be carried out very easily and forms merely a slight addition to the washing treatment which has to be employed to remove the acidity from the crude nitrocompound. When, for instance, the molten crude TNT has been made neutral or nearly acid-free in the usual way, it may, in one form of the invention, be given two washes at 80° C. with the sulphite solution, following which the red aqueous liquor is removed and the molten TNT is washed with hot water, dried, and flaked in the usual way. Compared with the known processes, this has the great advantage in that the need for crystallizing the TNT after the removal of the refuse acid and before the sulphiting, and for melting these crystals after the sulphiting and before the drying etc., is entirely eliminated. The new process requires no special apparatus and the cost of operating is very small. The product obtained is of good light cream or yellow color, free from beta and gamma TNT and other materials soluble in sodium sulphite, while the loss of alpha TNT is only about 3%. The crude TNT which is to be purified may be neutral, but may otherwise contain a small amount, say 0.1% of unremoved sulphuric acid. In the latter case the best results are obtained by suitably adjusting the composition of the weakly acid controlling mixture to compensate for the acidity of the TNT.

One method of carrying out the invention is illustrated in the following example, in which the parts are by weight.

*Example*

1000 parts of crude TNT are washed with water at 90° C. until practically free from mineral acid, and to the still molten material are added 1000 parts of an aqueous solution containing 40 parts sodium sulphite ($Na_2SO_3$), 30 parts sodium mono-hydrogen phosphate ($Na_2HPO_4$) and 10 parts sodium di-hydrogen phosphate ($NaH_2PO_4$), the temperature of the solution having been first adjusted so that on mixing the TNT and the aqueous phase, the mixture will register 80° C. The mixture is stirred with a propeller stirrer for 20 minutes, the temperature being maintained at approximately 80° C. The mixture is then allowed to settle and the aqueous liquor is siphoned off and replaced by a further batch of hot aqueous solution which may be about half the concentration of the former batch. Stirring is continued for 20 minutes, the temperature again being maintained at approximately 80° C., after which the phases are allowed to separate and the aqueous phase is removed. Finally the TNT while still molten is washed with hot water, until the wash water is practically colorless. The purified TNT is then dried and solidified according to normal practice.

It will be understood that with varying chemical nature and varying composition of the controlling weak acid or weak acid mixture, different optimum amounts thereof reckoned on the sulphite will be desirable. The greater proportion of the isomers can be removed in one treatment, but the complete removal may best be effected in more than one treatment, the exact number being largely a matter of choice, two being in general quite sufficient. The removal of the isomers is very rapid and it is not necessary to prolong the stirring together of the two phases beyond half an hour or so. There is no necessity to use a temperature greater than that required to maintain the TNT in the molten condition, i. e. at 78–80° C. Slightly higher temperatures may be employed, but if the temperature be too high, there is a tendency for the TNT to become slightly discolored. Thus we prefer to conduct the operation at a temperature not above 83° C.

It is not necessary to adhere to any special type of stirring provided the type chosen be effective in giving intimate contact of the molten nitrobody with the sulphite solution. I have used mechanical stirring, for instance with a gate or propeller stirrer, with good results, and have also obtained quite satisfactory results when the mixing together of the two phases was accomplished by using injected air.

The process of the present invention may be carried out on separate batches or may be carried out as part of a continuous process. The latter is accomplished for instance, by running molten crude TNT and sulphite solution continuously into a vessel where these two phases are being stirred together with the simultaneous discharge of a corresponding amount of the mixture into a vessel where the separation of the mixture into its two components is proceeding continuously.

I claim:

1. The process of purifying trinitrotoluene which comprises treating it in the molten state with an aqueous solution of an alkaline sulphite in the presence of a weakly acidic water-soluble substance, the initial hydrogen ion concentration of the aqueous solution being above 7.0.

2. The process of purifying trinitrotoluene which comprises treating it in the molten state with an aqueous solution of an alkaline sulphite in the presence of a weakly acidic water-soluble substance capable of dissociation in an amount at least sufficient to maintain an approximately constant hydrogen ion concentration throughout the operation.

3. The process of claim 1 in which the alkaline sulphite is sodium sulphite.

4. The process of claim 2 in which the initial hydrogen ion concentration of the aqueous solution lies between 7.0 and 8.3.

5. The process of claim 1 in which the purification is effected at a temperature not exceeding 83° C.

6. A process for purifying trinitrotoluene which is substantially free from mineral acids, which comprises treating it in the molten state at approximately its solidification temperature in presence of water, with a dilute aqueous solution of an alkali sulphite in presence of a weakly acidic substance, the initial hydrogen ion concentration of the aqueous solution lying between the limits 7.0 and 8.3 measured by the normal indicator colorimetric method, and separating the molten purified trinitrotoluene from the aqueous liquor.

7. The process of claim 6 in which the alkaline sulphite is sodium sulphite.

8. The process of claim 6 in which the purification is effected at a temperature not exceeding 83° C.

9. The process of purifying trinitrotoluene, which comprises treating it in the molten state with an aqueous solution of an alkaline sulfite in the presence of a weakly acidic substance comprising a mixture of sodium acetate and acetic acid.

10. The process of purifying trinitrotoluene, which comprises treating it in the molten state with an aqueous solution of an alkaline sulfite in the presence of a weakly acidic substance comprising a mixture of sodium monohydrogen phosphate and sodium di-hydrogen phosphate.

11. The process of purifying trinitrotoluene, which comprises treating it in the molten state with an aqueous solution of an alkaline sulfite in the presence of a weakly acidic substance comprising boric acid.

GEORGE PARKER DAVIES.